Patented Sept. 7, 1948

2,448,602

UNITED STATES PATENT OFFICE 2,448,602

GLYCIDYL ESTERS

Ernest B. Kester and Henry M. Preusser, Berkeley, Calif., assignors to the United States of America as represented by the Secretary of Agriculture No Drawing. Application August 21, 1943, Serial No. 499,504

1 Claim. (Cl. 260—348)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to glycidyl esters, and has for its object the provision of a new series of ether esters for plasticizing vinyl polymers.

We have found that the esters of glycidol, especially the esters of the group of fatty acids commonly occurring in vegetable oils, namely, lauric, myristic, palmitic, stearic, oleic, ricinoleic, linoleic, and linolenic acids, as well as the esters of butyric, abietic, and elaidic acids, and of the mixed acids occurring naturally as glycerides in vegetable oils, such as babassu, castor, and soybean oils, and of certain dibasic acids, such as succinic and sebacic acids, can be synthesized by causing the anhydrous salts or soaps of these acids to react with epichlorohydrin.

In carrying out our invention, the salts or soaps are first dehydrated in finely powdered form by heating at about 100° C. in a vacuum oven preferably with passage of a slow stream of dry air over or through the soap. The soaps are then transferred to a reaction vessel which is highly evacuated for several hours while immersed in a heating medium. Extreme dryness is essential to high yields of monomeric ester. It is difficult to desiccate soaps completely and, to compensate for residual moisture, it is preferable to use a soap that reacts strongly alkaline or else incorporate small amounts of basic substances such as calcium oxide, sodium carbonate, or sodium hydroxide. The exact function of the added base is not understood, but it is probable that it inhibits hydration of the glycidyl esters to form monoglycerides which in turn would react with more glycidyl ester to form esters of polyglycerol, and so on. When the drying is completed, a large excess of previously dried epichlorohydrin is added. The mixture is agitated vigorously and maintained at reflux temperature for a period of about 5 to 9 hours, after which the slurry of salt, glycidyl ester, excess epichlorohydrin and small amounts of unreacted soap is filtered and the liquid distilled at reduced pressure. The ester itself is distilled preferably at the lowest practicable working pressures. One millimeter is characteristically employed.

The chemical reaction which takes place in the above-described synthesis is illustrated by the following equations:

(a) For esters of monobasic acids

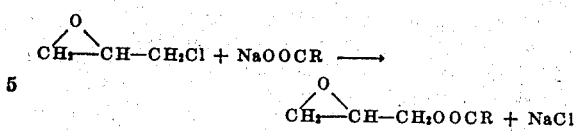

(b) For esters of dibasic acids

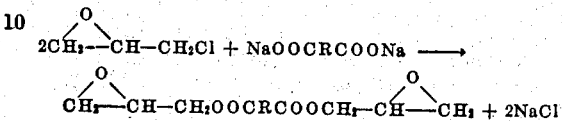

Our invention is illustrated by the following examples:

Example I

Preparation of glycidyl laurate.—100 g. of anhydrous potassium laurate (0.42 M) was reduced to a fine powder and transferred to a flask equipped with dropping funnel, stirring device, dry-air inlet, and reflux condenser. The charge of soap was raised to 90° C. by means of an oil bath and evacuated for one-half hour, after which pressure was restored by admitting air through a calcium chloride tube. Epichlorohydrin, 389 g. (4.2 M), was admitted through the dropping funnel which was thereafter replaced with a thermometer. Stirring produced a slurry of the soap and the epichlorohydrin. The mixture was heated with agitation for about 6 hours and 40 minutes by means of an oil bath maintained at 145–148° C., but the temperature of the contents of the flask remained at 114–117° C. due to the refluxing of epichlorohydrin. A decided change in the consistency of the mixture took place during the reaction as the soap became converted to glycidyl ester and potassium chloride. The latter was filtered off and washed with a little benzene, after which the combined filtrates were distilled at reduced pressure to remove benzene and excess epichlorohydrin, and finally at 1 mm. to distill the glycidyl laurate. Between the temperatures 126–128° C., 89 g. of glycidyl laurate was obtained, representing a yield of 82.3 percent. The equivalent weight of the product by saponification was found to be 255.8, as compared with the calculated equivalent weight of 256.37 for pure glycidyl laurate.

Example II

Preparation of glycidyl palmitate.—A mixture of 209 g. of sodium palmitate (0.75 M), 534 g. of epichlorohydrin (5.78 M), and 1 g. of sodium hydroxide was thoroughly blended and charged into a stainless steel autoclave equipped with rocking device and heating elements. The bomb was heated for 4.5 hours with agitation at a temperature not in excess of 150° C. After the bomb had cooled sufficiently, it was opened and the contents removed. Sufficient sodium bicarbonate was added to convert the caustic previously introduced to sodium carbonate, after which about 60 ml. of epichlorohydrin was removed by distillation. The solid material was then filtered off and the liquid portion distilled without fractionation at 1 mm. The product came over at about 170° C. and amounted to 150 g. It had a melting point of 38–41.5° C.

Example III

*Preparation of glycidyl oleate.*—Sodium oleate, 101.5 g. (0.33 M), was placed in the apparatus described under Example I, together with 300 ml. of xylene, and heated with stirring. A clear yellow gel formed. Additional xylene was added in the amount of 200 ml. which thinned the gel until it became fairly fluid. When the temperature had reached 100° C., 224 g. of epichlorohydrin (2.42 M) was added. A white solid formed and the mixture thinned out still more. Reflux was maintained with stirring for a total of 8 hours, during which time the contents of the flask became steadily less viscous. It was found difficult to filter the reaction product but with the addition of some diatomaceous earth, filtration took place with comparative ease. The cake resulting from the filtration was washed with xylene. The combined filtrate was distilled first at slightly reduced pressure to recover xylene and excess epichlorohydrin and finally at 1 mm. Between 185–190° C. about 50 g. of product was obtained having a saponification equivalent of 335. Calculated for glycidyl oleate, 338.51.

Example IV

*Preparation of the glycidyl esters of rosin acids.*—The following ingredients were thoroughly mixed to a smooth paste and transferred to a 1-liter stainless steel bomb: 162 g. of rosin sodium soaps (0.5 M), 462.5 g. of epichlorohydrin (5 M), and 0.5 g. of sodium hydroxide. The bomb was sealed and placed in a preheated rocker, brought to 175° C. in one hour and held between 175° C. 185° C. for 1.5 hours. After cooling, the reaction product was filtered to remove sodium chloride and distilled through a short column at 2 mm. until the flask temperature had reached 145° C. The residue of glycidyl esters of rosin acids was a thick viscous sirup weighing 161 g. This material was distillable for the most part to a pale yellow product which would barely flow at room temperature.

Example V

*Preparation of the glycidyl esters of fatty acids of babassu oil.*—Babassu oil fatty acids, 550 g., epichlorohydrin, 1250 g., and sodium hydroxide, 1 g., were thoroughly blended and charged into a 1-liter stainless steel pressure vessel, and maintained at a temperature of 135° C. for one and three-quarters hours, after which the reaction vessel was cooled and the contents filtered with suction. The excess epichlorohydrin was distilled off under reduced pressure, leaving a residual oil representing a conversion of 86.6 percent of the soaps charged.

Time is an important factor in the conversion of soaps to esters of glycidol. Sufficient time must be allowed for the initial conversion of the soaps to ester, but excessive time is to be avoided in the interest of minimizing secondary reactions. Under conditions of reflux, 5 to 9 hours is usually optimum. This may be materially reduced if superatmospheric pressure and higher temperatures are employed, but the danger of polymerization is correspondingly increased. We have found that 150° C. is about the practical upper limit of temperature.

Our invention is not limited to the compounds cited by way of illustration, but is applicable generally to the preparation of esters of epoxy alcohols, such as the esters of beta-methyl glycidol.

Having thus described our invention, we claim:

The method of preparing glycidyl esters which comprises reacting an anhydrous alkali metal salt of an acid selected from the group consisting of lauric, myristic, palmitic, stearic, oleic, ricinoleic, linoleic, linolenic, butyric, abietic, elaidic, succinic and sebacic acids, with a molar excess of epichlorohydrin and a minor amount of a substance taken from the group consisting of oxides, hydroxides, and carbonates of alkali and alkaline earth metals under anhydrous conditions at refluxing temperature for a period of about 5 to 9 hours.

ERNEST B. KESTER.
HENRY M. PREUSSER.

REFERENCES CITED

The following references are of record in the file of this patent:

UNITED STATES PATENTS

| Number | Name | Date |
|---|---|---|
| 2,252,039 | Schirm | Aug. 12, 1941 |

OTHER REFERENCES

Levene et al., Jr. Biol. Chem., vol. 77 (1928), pages 685 to 696.